United States Patent
Wu et al.

(10) Patent No.: US 10,852,867 B2
(45) Date of Patent: Dec. 1, 2020

(54) TOUCH DISPLAY DEVICE AND GATE DRIVER THEREOF

(71) Applicant: InnoLux Corporation, Miao-Li County (TW)

(72) Inventors: Chun-Fu Wu, Miao-Li County (TW); Wei-Kuang Lien, Miao-Li County (TW); Wen-Tsai Hsu, Miao-Li County (TW); Sheng-Feng Huang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/150,457

(22) Filed: Oct. 3, 2018

(65) Prior Publication Data

US 2019/0114013 A1    Apr. 18, 2019

(30) Foreign Application Priority Data

Oct. 12, 2017 (CN) .......................... 2017 1 0947390

(51) Int. Cl.
*G06F 3/041* (2006.01)
*G09G 3/20* (2006.01)

(52) U.S. Cl.
CPC .......... *G06F 3/0412* (2013.01); *G06F 3/0416* (2013.01); *G09G 3/20* (2013.01); *G09G 2310/0286* (2013.01); *G09G 2310/08* (2013.01)

(58) Field of Classification Search
CPC ..................................................... G06F 3/0412
USPC ......................................................... 345/173
See application file for complete search history.

(56) References Cited

U.S. PATENT DOCUMENTS

| 2017/0221441 A1* | 8/2017 | Gu | G06F 3/0412 |
| 2018/0004329 A1* | 1/2018 | So | G06F 3/0416 |
| 2018/0067353 A1* | 3/2018 | Son | G09G 3/20 |
| 2018/0181244 A1* | 6/2018 | Sato | G09G 3/3266 |

FOREIGN PATENT DOCUMENTS

| CN | 106531120 A | 3/2017 |
| TW | 201701260 A | 1/2017 |

* cited by examiner

*Primary Examiner* — Long D Pham
(74) *Attorney, Agent, or Firm* — McClure, Qualey & Rodack, LLP (57) ABSTRACT

A touch display device at least including a gate driver is provided. The gate driver at least includes a pull-up control circuit, a pull-down control circuit and a pull-up output circuit. The pull-up control circuit sets the voltage level of a first node to a first voltage level. The pull-down control circuit is configured to set the voltage level of the first node to a second voltage level and includes a first transistor receiving an operation voltage. The second voltage level is lower than the first voltage level. The pull-up output circuit generates a scan signal according to the voltage level of the first node. During a first display period and a second display period, the operation voltage is equal to a first gate voltage. During a touch-sensing period, the operation voltage is equal to a second gate voltage that is lower than the first gate voltage.

14 Claims, 8 Drawing Sheets

TOUCH DISPLAY DEVICE AND GATE DRIVER THEREOF

CROSS REFERENCE TO RELATED APPLICATIONS

This Application claims priority of China Patent Application No. 201710947390.7, filed on Oct. 12, 2017, the entirety of which is incorporated by reference herein.

BACKGROUND OF THE DISCLOSURE

Field of the Disclosure

The disclosure relates to a display device, and more particularly to a display device having touch functionality.

Description of the Related Art

Liquid-crystal displays (LCDs) are widely used because they possess favorable advantages, such as having a thin profile and low radiation, and being lightweight. To increase convenience, current display devices have touch functionality. A conventional method divides a frame period into a plurality of display period and a plurality of touch-sensing periods. Each touch-sensing period is between two display periods.

Generally, during each display period, the control circuit disposed in a display device generates a plurality of clock signals to a display panel so that the display panel of the display device can display images. During each touch-sensing period, the control circuit senses whether the display panel is touched and generates a detection result. To avoid the detection result being interfered with by the clock signals, the control circuit stops generating the clock signals during the touch-sensing period. However, the voltage levels of the nodes in other circuits may be changed when the conventional control circuit stops generating the clock signals so that the display device cannot display the correct images.

BRIEF SUMMARY OF THE DISCLOSURE

In accordance with an embodiment, a touch display device comprises a gate driver, a data driver and a display region. The gate driver at least comprises a pull-up control circuit, a pull-down control circuit and a pull-up output circuit. The pull-up control circuit is configured to set a voltage level of a first node to a first voltage level. The pull-down control circuit is configured to set the voltage level of the first node to a second voltage level that is lower than the first voltage level and comprises a first transistor receiving an operation voltage. The pull-up output circuit generates a scan signal according to the voltage level of the first node. The data driver generates at least one data signal. The display region displays an image according to the scan signal and the data signal. During a first display period and a second display period, the operation voltage is equal to a first gate voltage. During a touch-sensing period, the operation voltage is equal to a second gate voltage that is lower than the first gate voltage.

In accordance with another embodiment, a gate driver generates a first scan signal and comprises a first shift register. The first shift register comprises a first pull-up control circuit, a first pull-down control circuit and a first pull-up output circuit. The first pull-up control circuit is configured to set a voltage level of a first node to a first voltage level according to a start signal. The first pull-down control circuit is configured to set the voltage level of the first node to a second voltage level that is lower than the first voltage level. The first pull-down control circuit comprises a first transistor receiving an operation voltage. The first pull-up output circuit generates the first scan signal according to the voltage level of the first node. During a first display period and a second display period, the operation voltage is equal to a first gate voltage. During a touch-sensing period, the operation voltage is equal to a second gate voltage that is lower than the first gate voltage.

BRIEF DESCRIPTION OF THE DRAWINGS

The disclosure can be more fully understood by referring to the following detailed description and examples with references made to the accompanying drawings, wherein.

DETAILED DESCRIPTION OF THE DISCLOSURE

The present disclosure will be described with respect to particular embodiments and with reference to certain drawings, but the disclosure is not limited thereto and is limited by the claims. The drawings described are schematic and are non-limiting. In the drawings, the size of some of the elements may be exaggerated for illustrative purposes and not drawn to scale. The dimensions and the relative dimensions do not correspond to actual dimensions in the practice of the disclosure.

Figure 1A:
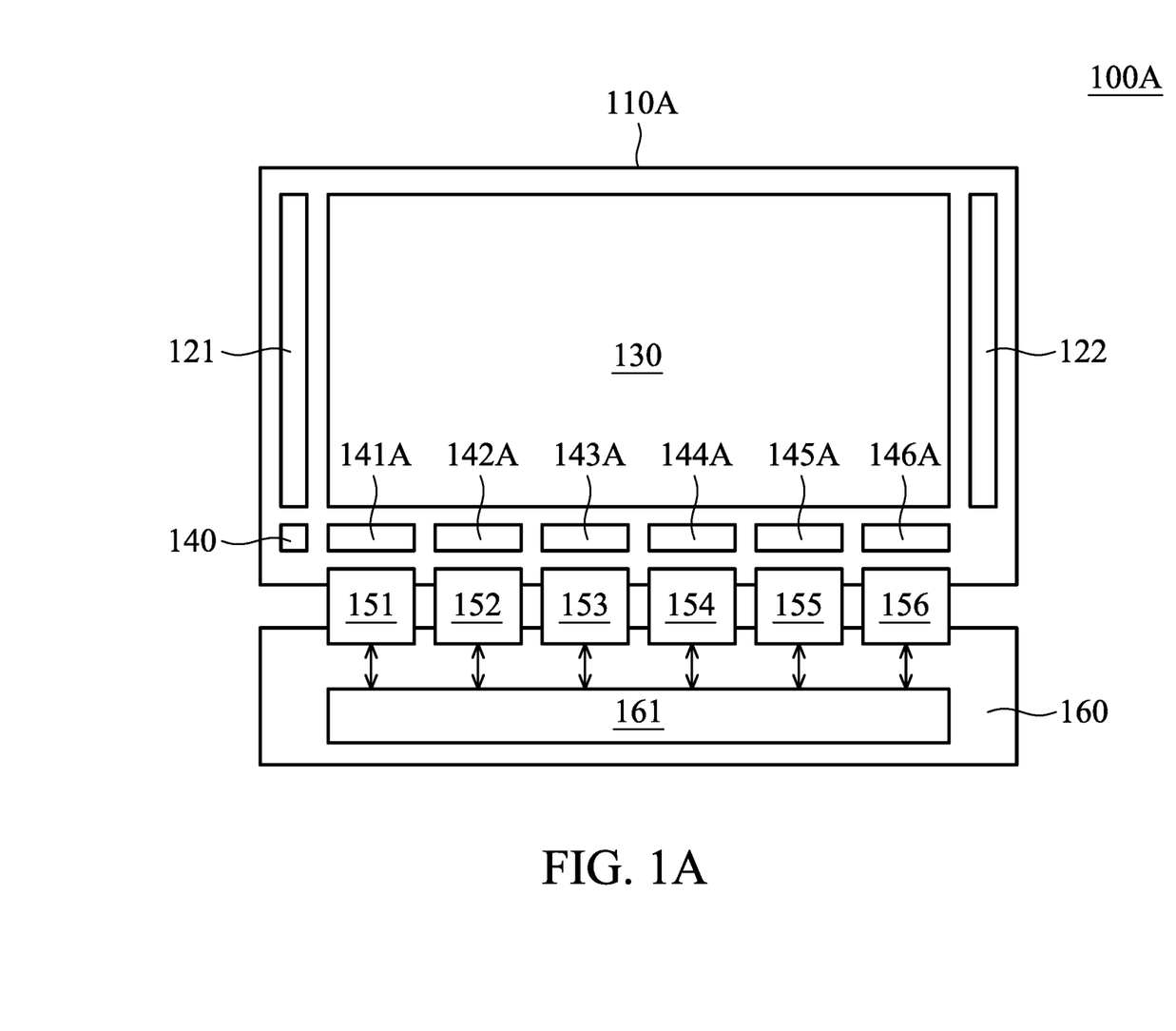
FIG. 1A is a schematic diagram of an exemplary embodiment of a touch display device, according to various aspects of the present disclosure.

FIG. 1A is a schematic diagram of an exemplary embodiment of a touch display device, according to various aspects of the present disclosure. The touch display device 100A comprises a display panel 110A, flexible printed circuit (FPC) boards 151~156 and a control circuit 160. The FPC boards 151~156 are coupled between the display panel 110A and the control circuit 160 to transmit control signals generated by the control circuit 160 to the display panel 110A. For brevity, FIG. 1A shows the FPC boards 151~156, but the disclosure is not limited thereto. In other embodiments, the touch display device 100A comprises more PC boards or fewer PC boards. Furthermore, the touch display device 100A may be a flexible display device.

The display panel 110A comprises gate drivers 121 and 122, a display region 130, a timing controller 140 and a data driver 141A~146A. The gate driver 121 is disposed in the left-side of the display region 130 and the gate driver 122 is disposed in the right-side of the display region 130, but the disclosure is not limited thereto. In another embodiment, the display panel 110A comprises a single gate driver or more gate drivers.

The data drivers 141A~146A are disposed in the bottom-side of the display region 130, but the disclosure is not limited thereto. In other embodiments, the data drivers 141A~146A are disposed on the FPC boards 151~156, respectively. In the disclosure, the number of data drivers is not limited. In some embodiments, the display panel 110A comprises more or fewer data drivers.

The timing controller 140 is configured to trigger and control the gate drivers 121 and 122 and the data drivers 141A~146A. In one embodiment, the timing controller 140 is integrated into each of the data drivers 141A~146A. In other words, each data driver comprises a timing controller. In some embodiments, the timing controller 140 is independent from the data drivers 141A~146A. In this embodiment, the control circuit 160 at least comprises an image processor 161 to generate a plurality of image signals to the display panel 110A. In other embodiments, the image processor 161 is disposed on the display panel 110A. In the present disclosure, the locations of the gate drivers 121 and 122, the data drivers 141A~146A and the timing controller 140 are not limited. Any one of the gate drivers 121 and 122, the data drivers 141A~146A and the timing controller 140 may be disposed on the display panel 110A or outside of the display panel 110A.

Figure 1B:
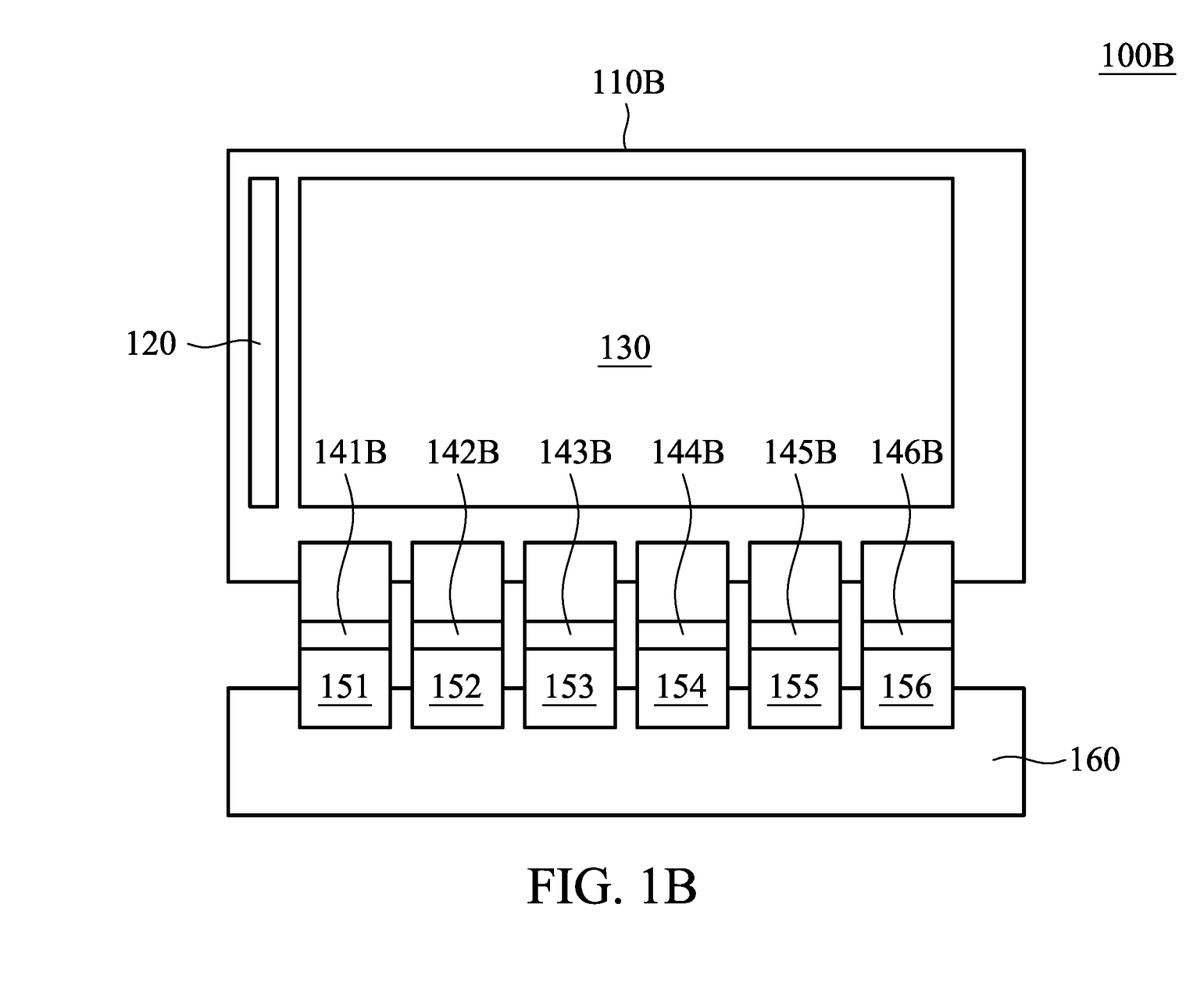
FIG. 1B is a schematic diagram of another exemplary embodiment of the controller, according to various aspects of the present disclosure.

FIG. 1B is a schematic diagram of another exemplary embodiment of the controller, according to various aspects of the present disclosure. The touch display device 100B comprises a display panel 110B, FPC boards 151~156 and a control circuit 160. In this embodiment, the display panel 110B comprises a single gate driver 120. The gate driver 120 is disposed in the left-side of the display region 130, but the disclosure is not limited thereto. In another embodiment, the gate driver 120 may be disposed in the right-side of the display region 130. In the present disclosure, the number of gate drivers is not limited. In some embodiments, the display panel 110B may comprise more gate drivers or fewer gate drivers.

Each of the FPC boards 151~156 is coupled between the display panel 110B and the control circuit 160 and comprises a data driver. For example, the FPC board 151 comprises a data driver 141B, and the FPC board 152 comprises a data driver 142B. In other embodiments, the data drivers 141B~146B are disposed on the display panel 110B. The number of data drivers is not limited in the present disclosure. In some embodiment, the touch display device 100B comprises more data drivers or fewer data drivers. In one embodiment, each of the data drivers 141B~146B comprises a timing controller (not shown). In this case, the display panel 110B further comprises a timing controller to trigger the gate driver 120, but the disclosure is not limited thereto. In some embodiments, the gate driver 120 is controlled by the timing controller disposed in the data driver 141B.

Figure 2:
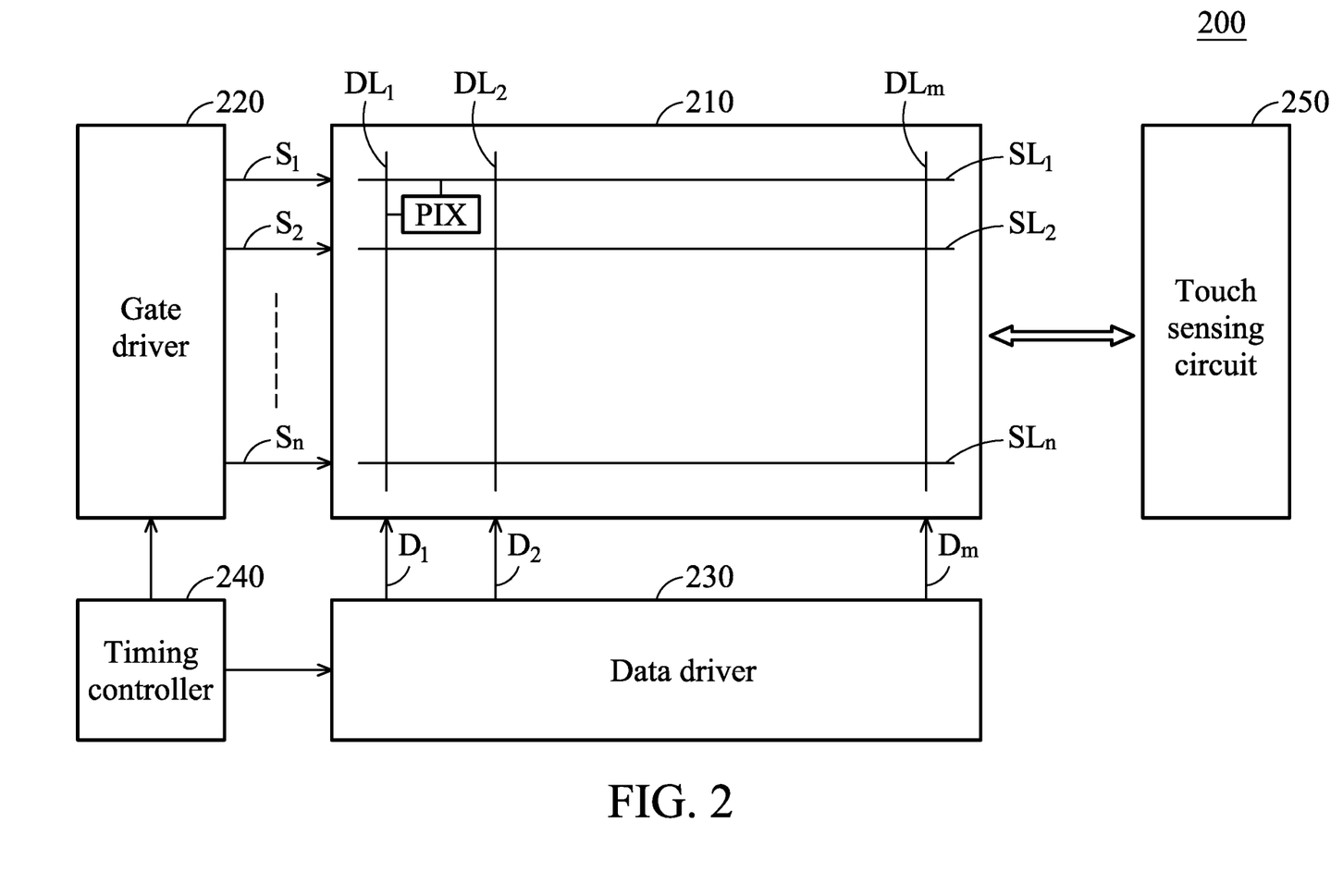
FIG. 2 is a schematic diagram of an exemplary embodiment of a display panel, according to various aspects of the present disclosure.

FIG. 2 is a schematic diagram of an exemplary embodiment of a display panel, according to various aspects of the present disclosure. The display panel 200 comprises a display region 210, a gate driver 220, a data driver 230, a timing controller 240 and a touch-sensing circuit 250. The gate driver 220 is configured to generate scan signals $S_1$~$S_n$. The data driver 230 is configured to generate data signals $D_1$~$D_m$.

The display region 210 displays an image according to the scan signals $S_1$~$S_n$ and the data signals $D_1$~$D_m$. In this embodiment, the display region 210 comprises scan lines $SL_1$~$SL_n$, data lines $DL_1$~$DL_m$ and a plurality of pixels PIX. Each pixel PIX is coupled to a scan line and a data line. Each pixel PIX receives a corresponding data signal according to a corresponding scan signal and emits light according to the corresponding data signal. In the present disclosure, the structure of each pixel PIX is not limited. In one embodiment, each pixel PIX at least comprises liquid crystal components, an organic light emitting diode (OLED) or an inorganic light emitting diode (ex. a micro LED).

The timing controller 240 generates control signals (not shown) to control the gate driver 220 and the data driver 230 so that the gate driver 220 generates the scan signals $S_1$~$S_n$ and the data driver 230 generates the data signals $D_1$~$D_m$. In one embodiment, the timing controller 240 is integrated into the data driver 230. The touch-sensing circuit 250 detects whether the display region 210 is touched and generates a detection result to the data driver 230. In another embodiment, the touch-sensing circuit 250 is integrated into the data driver 230. In some embodiments, the touch-sensing circuit 250 is controlled by the timing controller 240. In other embodiments, the timing controller 240 and the touch-sensing circuit 250 are integrated into the data driver 230.

In this embodiment, the gate driver 220 comprises a plurality of shift registers. Each of the shift registers generates a shifted signal. In one embodiment, each shift register generates a shifted signal according to a shifted signal provided from a previous shift register wherein the first shift register generates a shifted signal according to a start signal. In this case, each shifted signal serves as one of the scan signals $S_1$~$S_n$.

Figure 3:
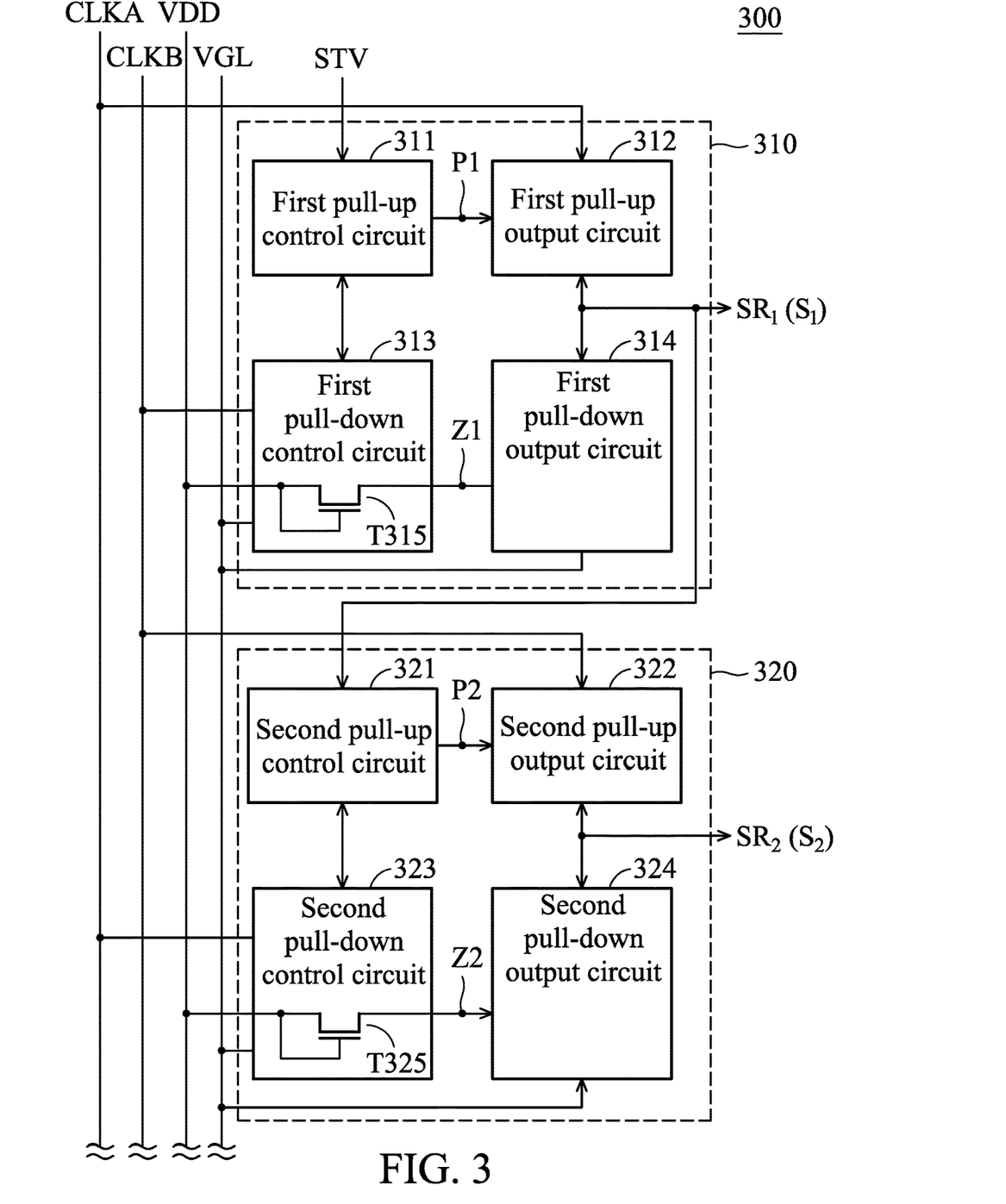
FIG. 3 is a schematic diagram of an exemplary embodiment of a gate driver, according to various aspects of the present disclosure.

FIG. 3 is a schematic diagram of an exemplary embodiment of a gate driver, according to various aspects of the present disclosure. The gate driver 300 comprises a first shift register 310 and a second shift register 320, but the disclosure is not limited thereto. In other embodiments, the gate driver 300 further comprises more shift registers. The first shift register 310 generates a first shifted signal $SR_1$ according to a start signal STV. The second shift register 320 is coupled to the first shift register 310 in series and generates a second shifted signal $SR_2$ according to the first shifted signal $SR_1$. In one embodiment, the first shifted signal $SR_1$ is provided as a first scan signal, such as $S_1$ and the second shifted signal $SR_2$ is provided as a second scan signal.

The first shift register 310 comprises a first pull-up control circuit 311, a first pull-up output circuit 312, a first pull-down control circuit 313 and a first pull-down output circuit 314. The first pull-up control circuit 311 is coupled to the first pull-up output circuit 312 and the pull-down control circuit 313. The first pull-up control circuit 311 is configured to pull-up the voltage level of a first node P1 to a first voltage level, such as a high voltage level. In this embodiment, the first pull-up control circuit 311 sets the voltage level of the first node P1 to the first voltage level.

The first pull-up output circuit 312 generates the first shifted signal $SR_1$ according to the voltage level of the first node P1. In one embodiment, the first shifted signal $SR_1$ serves as a first scan signal, such as $S_1$. In this embodiment, the first pull-up output circuit 312 receives a first clock signal CLKA. When the voltage level of the first node P1 is a high voltage level, the first pull-up output circuit 312 generates the first shifted signal $SR_1$ according to the first clock signal CLKA.

The pull-down control circuit 313 is coupled to the first pull-up control circuit 311 and a second node Z1. The pull-down control circuit 313 receives a second clock signal CLKB, an operation voltage VDD and a second gate voltage VGL. In one embodiment, the phases of the second clock signal CLKB are opposite to the phases of the first clock signal CLKA. In another embodiment, the first clock signal CLKA and the second clock signal CLKB are generated by the same timing controller. In other embodiment, the second gate voltage VGL is a negative value.

In this embodiment, the pull-down control circuit 313 pulls down the voltage level of the first node P1 to a second voltage level. The second voltage level may be a low voltage level lower than the first voltage level. Additionally, the pull-down control circuit 313 sets the voltage level of the second node Z1 in such a way that the voltage level of the first node P1 is maintained and equal to the second voltage level. As shown in FIG. 3, the pull-down control circuit 313 comprises a first transistor T315. The gate and the drain of the first transistor T315 receive the operation voltage VDD. Therefore, the first transistor T315 is referred to as a diode connected transistor. The source of the first transistor T315 is coupled to the second node Z1. When the operation voltage VDD is equal to a first gate voltage VGH (a positive value), the voltage level of the second node Z1 is equal to a high voltage level. Conversely, when the operation voltage VDD is equal to the second gate voltage VGL, the voltage level of the second node Z1 is equal to a low voltage level.

The first pull-down output circuit 314 is coupled to the first pull-up output circuit 312 and the second node Z1 and receives the second gate voltage VGL. In this embodiment, the first pull-down output circuit 314 sets the voltage level of the first shifted signal $SR_1$ according to the voltage level of the second node Z1. In this embodiment, the first pull-down output circuit 314 sets the first shifted signal $SR_1$ to the second gate voltage VGL.

The second shift register 320 comprises a second pull-up control circuit 321, a second pull-up output circuit 322, a second pull-down control circuit 323 and a second pull-down output circuit 324. The second pull-up control circuit 321 is coupled to the second pull-up output circuit 322 and the second pull-down control circuit 323. In this embodiment, second pull-up control circuit 321 sets the voltage level of a third node P2 to the first voltage level, such as a high voltage level, according to the first shifted signal $SR_1$.

The second pull-up output circuit 322 generates a second shifted signal $SR_2$ according to the voltage level of the third node P2. In one embodiment, the second shifted signal $SR_2$ is provided as a second scan signal, such as $S_2$. In this embodiment, the second pull-up output circuit 322 receives the second clock signal CLKB and generates the second shifted signal $SR_2$ according to the voltage level of the third node P2 and the second clock signal CLKB.

The second pull-down control circuit 323 is coupled to the second pull-up output circuit 321 and a fourth node Z2. As shown in FIG. 3, the second pull-down control circuit 323 receives the first clock signal CLKA, the operation voltage VDD and the second gate voltage VGL. In this embodiment, the second pull-down control circuit 323 sets the voltage level of the third node P2 to the second voltage level according to the first clock signal CLKA. Additionally, the second pull-down control circuit 323 sets the voltage level of the fourth node Z2 according to the operation voltage VDD to maintain the voltage level of the third node P2 at the second voltage level. In this embodiment, the second pull-down control circuit 323 comprises a second transistor T325. The gate and the drain of the second transistor T325 receive the operation voltage VDD. Therefore, the second transistor T325 is referred to as a diode connected transistor. The source of the second transistor T325 is coupled to the fourth node Z2. When the operation voltage VDD is equal to the first gate voltage VGH, the voltage level of the fourth node Z2 is equal to a high voltage level. Conversely, when the operation voltage VDD is equal to the second gate voltage VGL, the voltage level of the fourth node Z2 is equal to a low voltage level.

The second pull-down output circuit 324 is coupled to the second pull-up output circuit 322 and the fourth node Z2. The second pull-down output circuit 324 receives the second gate voltage VGL. In this embodiment, the second pull-down output circuit 324 sets the voltage level of the second shifted signal $SR_2$ according to the voltage level of the fourth node Z2. In this embodiment, the second pull-down output circuit 324 sets the second shifted signal $SR_2$ to the second gate voltage VGL.

In this embodiment, the pull-up output circuits (e.g. 312) in the odd shift registers (e.g. 310) receive the first clock signal CLKA, and the pull-up output circuits (e.g. 322) in the even shifted registers (e.g. 320) receive the second clock signal CLKB. In addition, the pull-down control circuits (e.g. 313) in the odd shift registers (e.g. 310) receive the second clock signal CLKB, and the pull-down control circuits (e.g. 323) in the even shift registers (e.g. 320) receive the first clock signal CLKA.

When the gate driver 300 operates in a display mode, the first shift register 310 generates the first shifted signal $SR_1$ and the second shift register 320 generates the second shifted signal $SR_2$. When the gate driver 300 operates in a touch-sensing mode, the first shift register 310 stops generating the first shifted signal $SR_1$ and the second shift register 320 stops generating the second shifted signal $SR_2$. At this time, the timing controller 240 stops providing the first clock signal CLKA and the second clock signal CLKB. In the touch-sensing mode, when the operation voltage VDD is equal to the first gate voltage VGH, since the first transistor T315 and the second transistor T325 are turned on, the voltage levels of the second node Z1 and the fourth node Z2 are high voltage levels. When the voltage levels of the second node Z1 and the fourth node Z2 are high voltage levels, two discharging paths (not shown) are turned on. Therefore, the voltage levels of the first node P1 and the third node P2 are reduced in such a way that the voltage level of each of the first node P1 and the third node P2 is equal to a low voltage level. When the gate driver 300 exits the touch-sensing mode and enters the display mode, since the voltage level of each of the first node P1 and the third node P2 is equal to the low voltage level, the first shift register 310 and the second shift register 320 may not generate a normal shifted signal, such as $SR_1$ or $SR_2$. Therefore, the gate driver 300 cannot provide normal scan signals.

To solve the above problem, when the gate driver 300 operates in the touch-sensing mode, the timing controller 240 sets the operation voltage VDD to the second gate voltage VGL. Since the first transistor T315 and the second transistor T325 are turned off, the voltage level of each of the first node P1 and the third node P2 does not reduced to the second voltage level, such as a low voltage level. Therefore, when the gate driver 300 enters the display mode from the touch-sensing mode, the first shift register 310 and the second shift register 320 can generate normal shifted signals.

Figure 4:
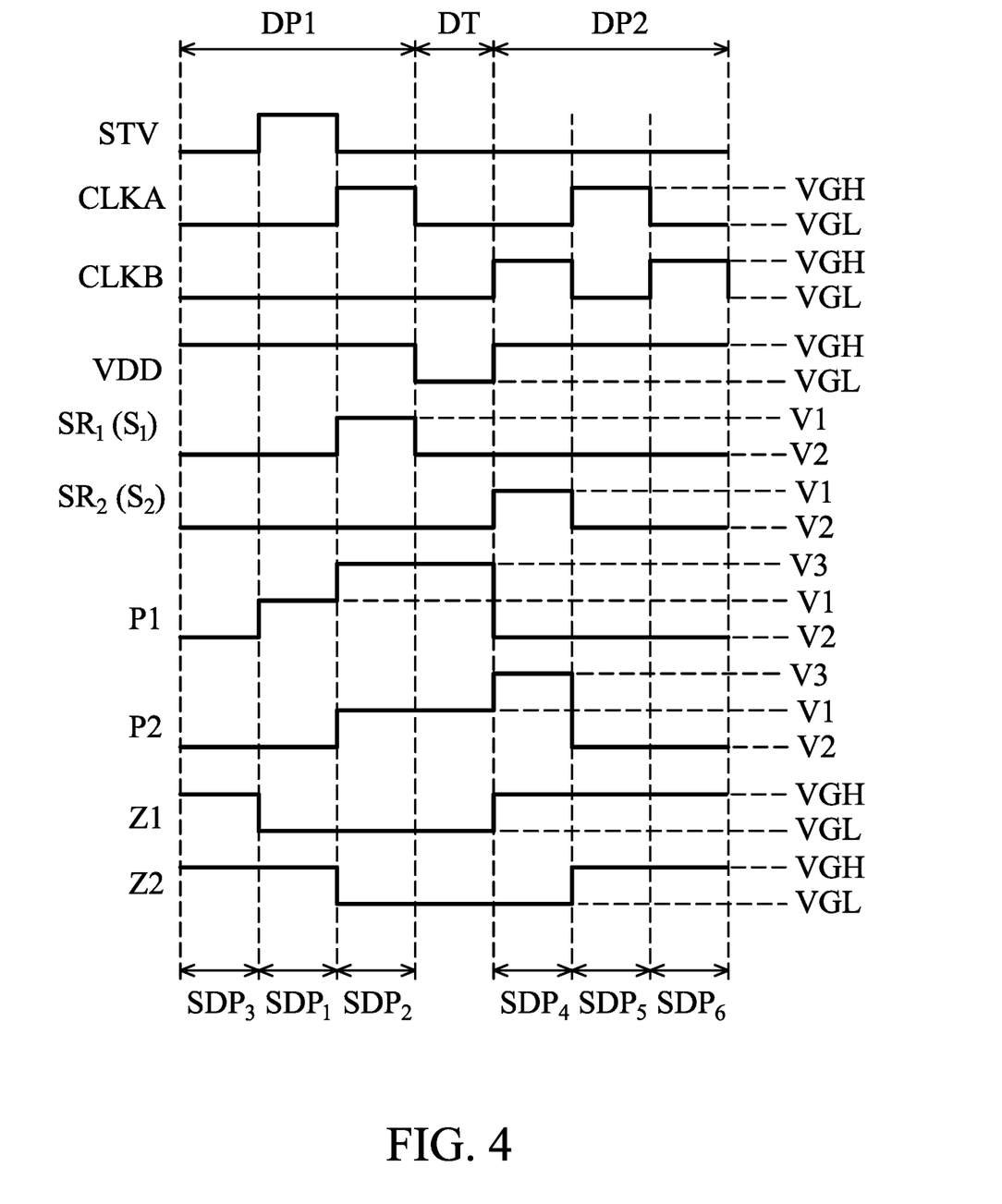
FIG. 4 is a timing diagram for controlling the gate driver according to various aspects of the present disclosure.

FIG. 4 is a control timing diagram of an exemplary embodiment of the gate driver 300, according to various aspects of the present disclosure. Refer to FIG. 3, during a first display period DP1 and a second display period DP2, the timing controller 240 maintains the operation voltage VDD to a first gate voltage VGH. At this time, the timing controller 240 also provides the first clock signal CLKA and the second clock signal CLKB to the gate driver 300. In this embodiment, the phases of the first clock signal CLKA are opposite to the phases of the second clock signal CLKB. In other words, the first clock signal CLKA and the second clock signal CLKB are complementary to each other.

During a touch-sensing period DT, the timing controller 240 stops provides the first clock signal CLKA and the second clock signal CLKB to the gate driver 300. Therefore, the first clock signal CLKA and the second clock signal CLKB are equal to the second gate voltage VGL. Furthermore, the timing controller 240 sets the operation voltage VDD to the second gate voltage VGL. Since each of the voltage levels of the second node Z1 and the fourth node Z2 is the second voltage level V2, the voltage levels of the first node P1 and the third node P2 do not reduced to the low voltage level. When the gate driver 300 enters the second display period DP2, the gate driver 300 is capable of providing normal scan signals, such as $S_1$ and $S_2$. In this embodiment, the touch-sensing period DT is between the first display period DP1 and the second display period DP2. During the touch-sensing period DT, the touch-sensing circuit 250 shown in FIG. 2 detects whether the display region 210 is touched. During the first display period DP1 and the second display period DP2, the touch-sensing circuit 250 stops operating.

In this embodiment, the first display period DP1 comprises a first sub-period $SDP_1$, a second sub-period $SDP_2$ and a third sub-period $SDP_3$. During the third sub-period $SDP_3$, a start signal STV, the first clock signal CLKA, the second clock signal CLKB, the first shifted signal $SR_1$, and the second shifted signal $SR_2$ are at the low voltage level, and each of the voltage levels of the first node P1 and the level of the third node P2 is the low voltage level. Furthermore, the operation voltage VDD is equal to the first gate voltage VGH. Therefore, the voltage level of the second node Z1 and the voltage level of the fourth node Z2 are equal to the first gate voltage VGH.

During the first sub-period $SDP_1$, the start signal STV is at a high voltage level so that the first pull-up control circuit 311 can set the voltage level of the first node P1 to the first voltage level V1. Therefore, the first pull-up output circuit 312 generates the first shifted signal $SR_1$ according to the first clock signal CLKA. In this case, since the timing controller 240 sets the first clock signal CLKA to the second gate voltage VGL, the first shifted signal $SR_1$ is at the second voltage level V2. Additionally, in this embodiment, the voltage level of the first node P1 is opposite to the voltage level of the second node Z1. Since the voltage level of the first node P1 is equal to the first voltage level V1, the voltage level of the second node Z1 is equal to the second gate voltage VGL. Furthermore, since the second shift register 320 does not receive the first shifted signal $SR_1$ having a high voltage level yet, the voltage level of the third node P2 is equal to the second voltage level V2 and the voltage level of the fourth node Z2 is equal to the first gate voltage VGH.

In addition, since the start signal STV is at a high voltage level during the first sub-period $SDP_1$, the timing controller 240 starts generating the first clock signal CLKA and the second clock signal CLKB during the second sub-period $SDP_2$. In this embodiment, the first clock signal CLKA and the second clock signal CLKB are at the low voltage level during the first sub-period $SDP_1$ and the third sub-period $SDP_3$.

During the second sub-period $SDP_2$, the timing controller 240 sets the first clock signal CLKA to the first gate voltage VGH. At this time, the voltage level of the first node P1 is increased to a third voltage level V3 due to a coupling effect. In this embodiment, the third voltage level V3 is high than the first voltage level V1. Since the voltage level of the first node P1 is equal to the third voltage level V3, the first pull-up output circuit 312 generates the first shifted signal $SR_1$ according to the first clock signal CLKA. In this case, the timing controller 240 sets the first clock signal CLKA to the first gate voltage VGH in such a way that the first shifted signal $SR_1$ is at the first voltage level V1. Additionally, since the voltage level of the first node P1 is equal to the third voltage level V3, the voltage level of the second node Z1 is still equal to the second gate voltage VGL.

During the second sub-period $SDP_2$, since the first shifted signal $SR_1$ is at the first voltage level V1, the second shift register 320 is triggered. Therefore, the voltage level of the third node P2 is equal to the first voltage level V1. Since the voltage level of the third node P2 is opposite to the voltage level of the fourth node Z2, the voltage level of the fourth node Z2 is equal to the second gate voltage VGL. Furthermore, since the voltage level of the third node P2 is equal to the first voltage level V1, the second pull-up output circuit 322 generates the second shifted signal $SR_2$ according to the second clock signal CLKB. In this case, since the second clock signal CLKB is equal to the second gate voltage VGL, the second shifted signal $SR_2$ is at the second voltage level V2.

During the touch-sensing period DT, the timing controller 240 stops generating the first clock signal CLKA and the second clock signal CLKB. Therefore, the first clock signal CLKA and the second clock signal CLKB are equal to the second gate voltage VGL. In this embodiment, the operation voltage VDD is equal to the second gate voltage VGL during the touch-sensing period DT so that the voltage level of the second node Z1 and the voltage level of the fourth node Z2 are equal to the second gate voltage VGL. At this time, the voltage level of the first node P1 is maintained at the third voltage level V3, and the voltage level of the third node P2 is maintained at the first voltage level V1. In some embodiments, the voltage level of the first node P1 and the voltage level of the third node P2 are reduced due to leaking current. In this case, the voltage level of the first node P1 and the voltage level of the third node P2 in the touch-sensing period DT may be slightly less than the voltage level of the first node P1 and the voltage level of the third node P2 in the second sub-period $SDP_2$.

The second display period DP2 comprises a fourth sub-period $SDP_4$, a fifth sub-period $SDP_5$ and a sixth sub-period $SDP_6$. During the fourth sub-period $SDP_4$, the operation voltage VDD is equal to the first gate voltage VGH. Since the second clock signal CLKB is equal to the first gate voltage VGH, the first pull-down control circuit 313 pulls down the voltage level of the first node P1 to the second voltage level V2. Since the voltage level of the first node P1 is opposite to the voltage level of the second node Z1, the voltage level of the second node Z1 is equal to the first gate voltage VGH. Therefore, the first pull-down output circuit 314 sets the first shifted signal $SR_1$ to the second voltage level V2. Furthermore, since the second clock signal CLKB is equal to the first gate voltage VGH, the voltage level of the third node P2 is equal to the third voltage level V3. Since the voltage level of the third node P2 is opposite to the voltage level of the fourth node Z2, the voltage level of the fourth node Z2 is equal to the second gate voltage VGL. Additionally, since the voltage level of the third node P2 is equal to the third voltage level, the second pull-up output circuit 322 generates a second shifted signal $SR_2$ according to the second clock signal CLKB. Since the second clock signal CLKB is equal to the first gate voltage VGH, the second shifted signal $SR_2$ is at the first voltage level V1.

During the fifth sub-period $SDP_5$, since the first clock signal CLKA is equal to the first gate voltage VGH, the second pull-down control circuit 323 sets the voltage level of the third node P2 to the second voltage level V2. Since the operation voltage VDD is equal to the first gate voltage VGH, the voltage level of the fourth node Z2 is equal to the first gate voltage VGH. Therefore, the second pull-down output circuit 324 sets the second shifted signal $SR_2$ to the second voltage level V2. At this time, the first shifted signal $SR_1$ and the voltage level of the first node P1 are at the second voltage level V2. In one embodiment, the second voltage level V2 is equal to the second gate voltage VGL.

During the sixth sub-period $SDP_6$, a third shift register (not shown) operates according to the second shifted signal $SR_2$. Since the operation of the third shift register is the same as the operation of the first shift register 310, the description of the third shift register is omitted for brevity.

Figure 5A:
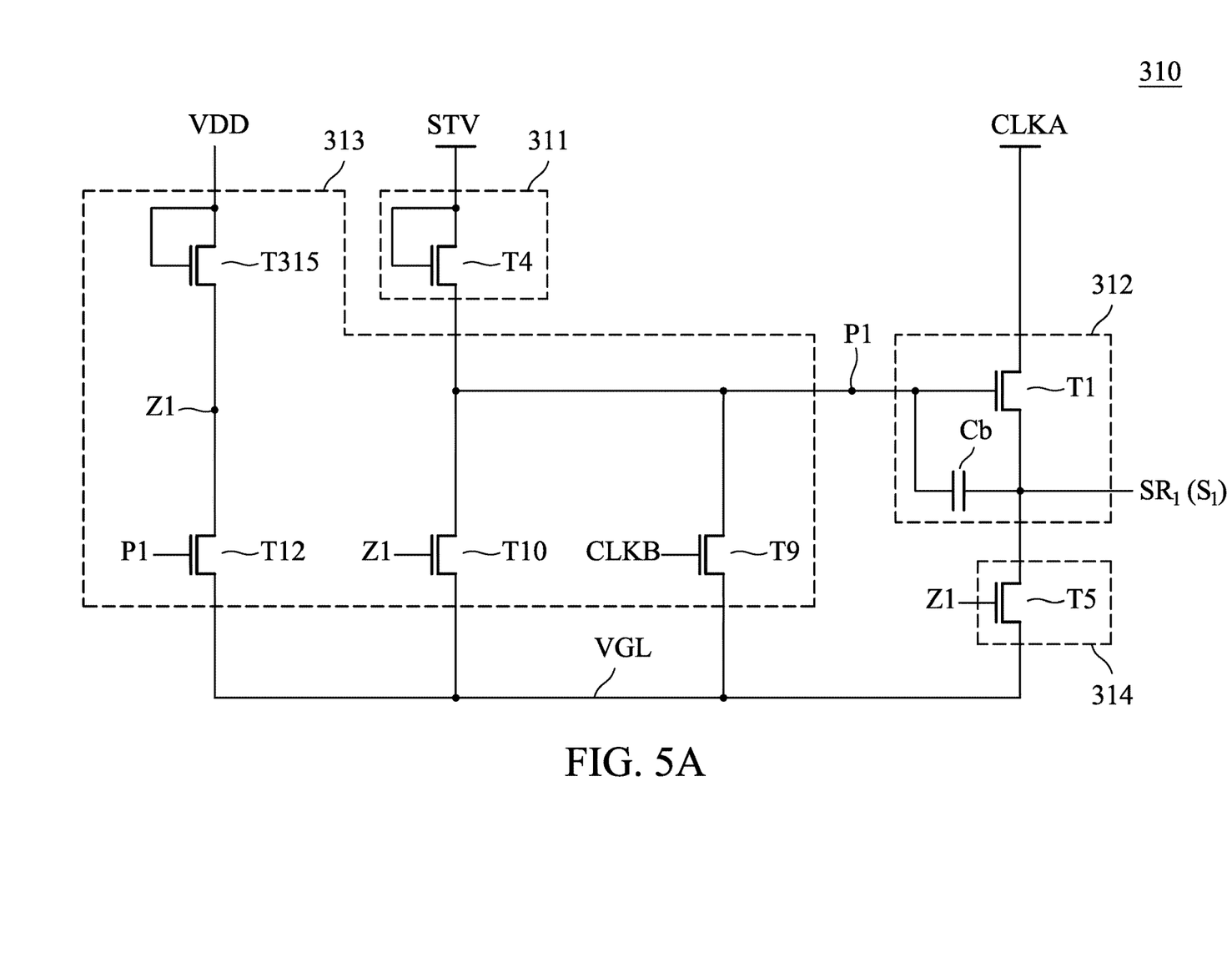
FIG. 5A is a schematic diagram of an exemplary embodiment of a shift register, according to various aspects of the present disclosure.

FIG. 5A is a schematic diagram of an exemplary embodiment of a shift register, according to various aspects of the present disclosure. Since the circuit structure of the first shift register 310 is the same as the circuit structure of the second shift register 320, FIG. 5A shows the circuit structure of the first shift register 310. In this embodiment, the first pull-up control circuit 311 comprises a transistor T4. The gate and the drain of the transistor T4 receive a start signal STV. Therefore, the transistor T4 is referred to as a diode connected transistor. Furthermore, the source of the transistor T4 is coupled to the first node P1. When the start signal STV is at a high voltage level.

The first pull-up output circuit 312 comprises a transistor T1 and a capacitor Cb. The gate of the transistor T1 is coupled to the first node P1. The drain of the transistor T1 receives the first clock signal CLKA. The source of the transistor T1 outputs the first shifted signal $SR_1$. The capacitor Cb is coupled between the gate and the source of the transistor T1. When the voltage level of the first node P1 is a high voltage level, such as the first voltage level V1 or the third voltage level V3, the transistor T1 generates the first shifted signal $SR_1$ according to the first clock signal CLKA. In this embodiment, since the first shift register 310 is an odd shift register, the transistor T1 receives the first clock signal CLKA. However, the transistor T1 in the even shift register receives the second clock signal CLKB.

The first pull-down control circuit 313 comprises a first transistor T315, a second transistor T12, a third transistor T9 and a fourth transistor T10. The gate and the drain of the first transistor T315 receive the operation voltage VDD. The source of the first transistor T315 is coupled to the second node Z1. The gate of the second transistor T12 is coupled to the first node P1. The drain of the second transistor T12 and the source of the first transistor T315 are together coupled to the second node Z1. The source of the second transistor T12 receives the second gate voltage VGL. The gate of the fourth transistor T10 is coupled to the second node Z1. The drain of the fourth transistor T10 is coupled to the first node P1. The source of the fourth transistor T10 receives the second gate voltage VGL. The gate of the third transistor T9 receives the second clock signal CLKB. The drain of the third transistor T9 is coupled to the first node P1. The source of the third transistor T9 receives the second gate voltage VGL. In this embodiment, since the first shift register 310 is an odd shift register, the third transistor T9 receives the second clock signal CLKB. However, the third transistor T9 in an even shift register (e.g. 320) receives the first clock signal CLKA.

When the voltage level of the first node P1 is equal to a high voltage level, the second transistor T12 is turned on. Therefore, the voltage level of the second node Z1 should be equal to a low voltage level, such as the second gate voltage VGL. However, since the first transistor T315 and the second transistor T12 are turned on simultaneously, the voltage level of the second node Z1 is slightly higher than the second gate voltage VGL. During the touch-sensing period DT, if the voltage level of the second node Z1 is not equal to the second gate voltage VGL, the fourth transistor T10 may be turned on so that the voltage level of the first node P1 is reduced to a low voltage level, such as the second gate voltage VGL.

To avoid the voltage level of the first node P1 being reduced to the low voltage level, the operation voltage VDD is equal to the second gate voltage VGL during the touch-sensing period DT so that the voltage level of the second node Z1 is equal to the low voltage level (e.g. the second gate voltage VGL). Therefore, the first node P1 is maintained at the high voltage level. When the first shift register 310 exits the touch-sensing mode and enters the display mode, since the voltage level of the first node P1 is maintained at the high voltage level, the transistor T1 generates the first shifted signal $SR_1$ according to the first clock signal CLKA.

During the display mode, when the second clock signal CLKB is at the high voltage level, the third transistor T9 is turned on to pull down the voltage level of the first node P1 to the low voltage level. Since the second transistor T12 is turned off and the operation voltage VDD is equal to the first gate voltage VGH, the voltage level of the second node Z1 is equal to the high voltage level. Therefore, the fourth transistor T10 is turned on. At this time, the voltage level of the first node P1 is maintained to the low voltage level.

The first pull-down output circuit 314 comprises a transistor T5. The gate of the transistor T5 is coupled to the second node Z1. The drain of the transistor T5 is coupled to the source of the transistor T1. The source of the transistor T5 receives the second gate voltage VGL. When the voltage level of the second node Z1 is equal to a high voltage level, the transistor T5 is turned on to pull down the first shifted signal $SR_1$ to a low voltage level. At this time, the first shifted signal $SR_1$ is equal to the second gate voltage VGL.

Figure 5B:
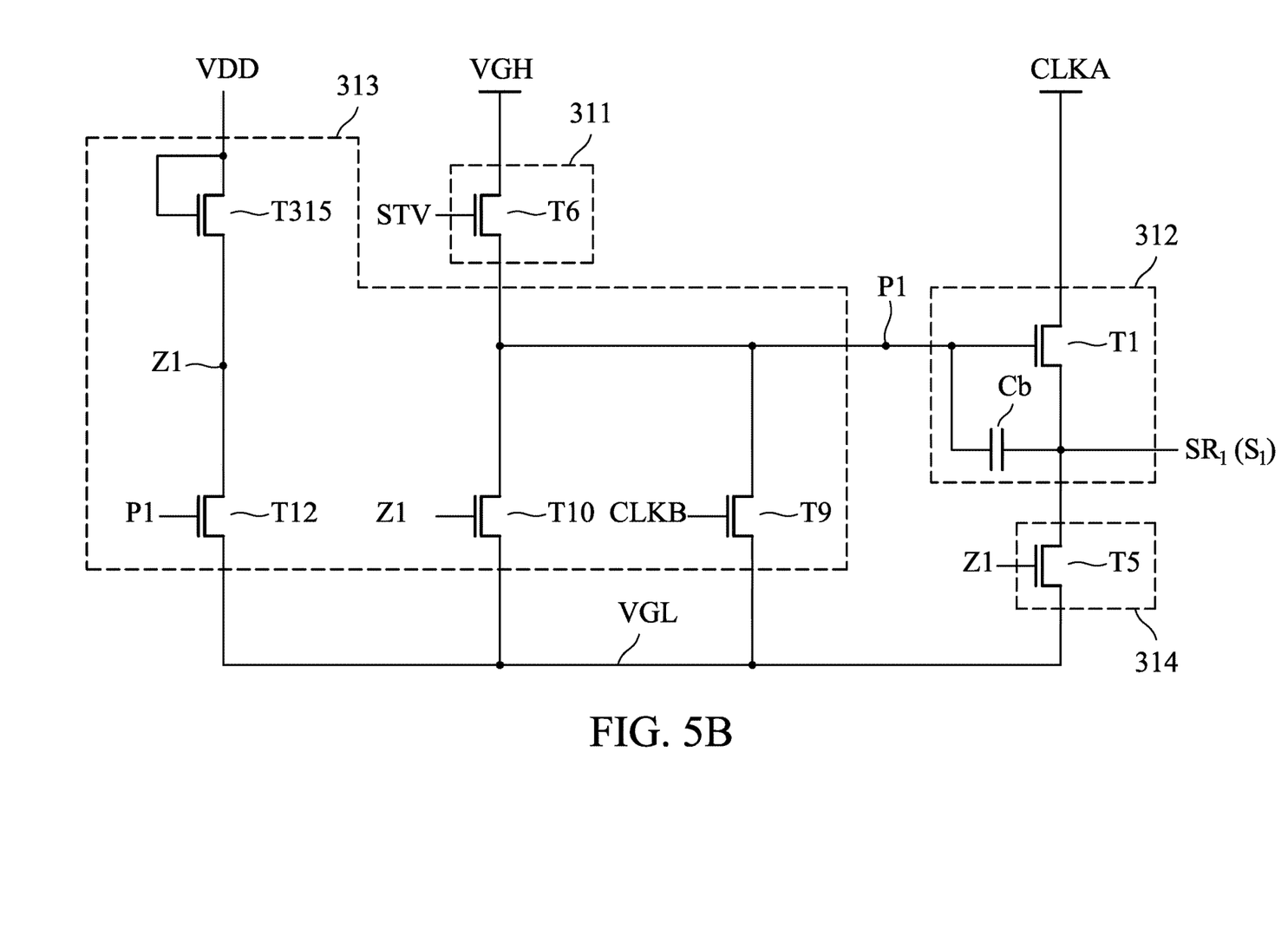
FIG. 5B is a schematic diagram of another exemplary embodiment of the shift register, according to various aspects of the present disclosure.

FIG. 5B is a schematic diagram of another exemplary embodiment of the shift register, according to various aspects of the present disclosure. FIG. 5A is similar to FIG. 5B with the exception that the first pull-up control circuit 311 in FIG. 5B comprises a transistor T6. The gate of the transistor T6 receives the start signal STV. The drain of the transistor T6 receives the first gate voltage VGH. The source of the transistor T6 is coupled to the first node P1. In this embodiment, when the start signal STV is at a high voltage level, the transistor T6 is turned on to set the voltage level of the first node P1 at a high voltage level. In this case, the voltage level of the first node P1 is equal to the first gate voltage VGH.

Figure 5C:
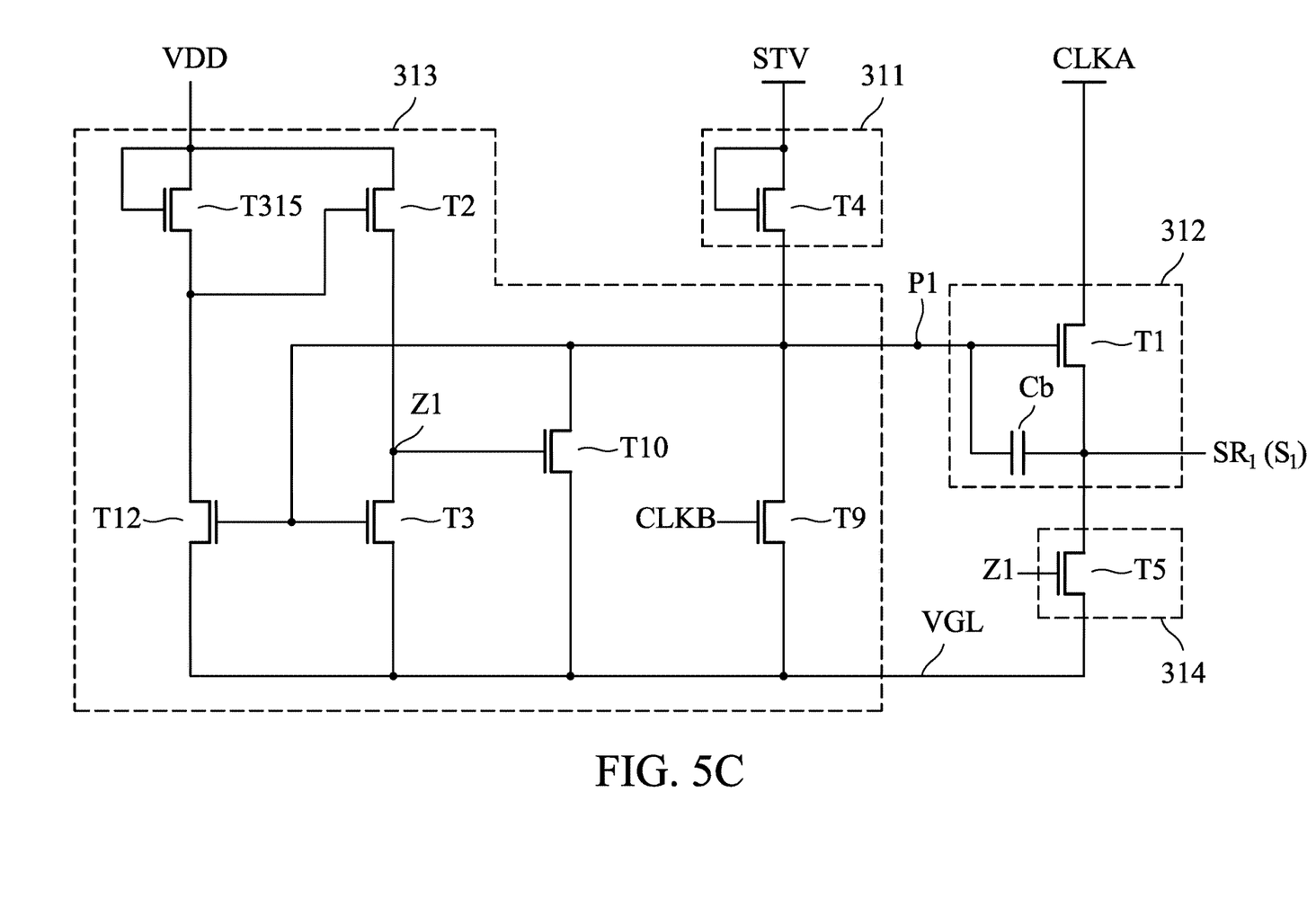
FIG. 5C is a schematic diagram of another exemplary embodiment of the shift register, according to various aspects of the present disclosure.

FIG. 5C is a schematic diagram of another exemplary embodiment of the shift register, according to various aspects of the present disclosure. FIG. 5C is similar to FIG. 5A exception that the first pull-down control circuit 313 in FIG. 5C comprises a first transistor T315, a second transistor T12, a third transistor T9, a fourth transistor T10, a transistor T2 and a transistor T3. In this embodiment, the first transistor T315 and the second transistor T12 do not couple to the second node Z1.

As shown in FIG. 5C, the gate of the transistor T2 is coupled to the source of the first transistor T315. The drain of the transistor T2 receives the operation voltage VDD. The source of the transistor T2 is coupled to the second node Z1. The gate of the transistor T3 is coupled to the gate of the second transistor T12 and the first node P1. The drain of the transistor T3 is coupled to the second node Z1 and the gate of the fourth transistor T10. The source of the transistor T3 receives the second gate voltage VGL.

For example, assume that during a specific display mode, the first shift register 310 triggers the first shifted signal $SR_1$ to a high voltage level. During a touch-sensing mode before the specific display mode, the operation voltage VDD is equal to the second gate voltage VGL so that the voltage level of the second node Z1 is equal to the second gate voltage VGL. At this time, the fourth transistor T10 is completely turned off so that the voltage level of the first node P1 is maintained to the high voltage level. When the first shift register 310 exits the touch-sensing mode and enters the specific display mode, since the voltage level of the first node P1 is equal to the high voltage level, the first pull-up output circuit 312 generates the first shifted signal $SR_1$ according to the first clock signal CLKA.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A touch display device, comprising:
a gate driver at least comprising:
a pull-up control circuit configured to set a voltage level of a first node to a first voltage level;
a pull-down control circuit configured to set the voltage level of the first node to a second voltage level that is lower than the first voltage level and comprising:
a first transistor receiving an operation voltage; and
a second transistor connected to the first transistor in series and coupled to the first node, wherein the first transistor and the second transistor are coupled to a second node; and
a pull-up output circuit generating a scan signal according to the voltage level of the first node;
a data driver generating at least one data signal;
a timing controller configured to provide a first clock signal to the pull-up output circuit during a first display period and a second display period; and
a display region displaying an image according to the scan signal and the data signal, wherein during the first display period and the second display period, the operation voltage is equal to a first gate voltage, and during a touch-sensing period, the operation voltage is equal to a second gate voltage that is lower than the first gate voltage, and
wherein the pull-down control circuit further comprises: a third transistor setting the voltage level of the first node to be equal to the second voltage level according to a second clock signal, and the second clock signal is generated by the timing controller,
wherein during the second display period, phases of the first clock signal and the second clock signal are opposite at all times.

2. The touch display device as claimed in claim 1, wherein during the touch-sensing period, the timing controller stops providing the first clock signal, and wherein responsive to the voltage level of the first node being equal to the first voltage level, the pull-up output circuit generates the scan signal according to the first clock signal.

3. The touch display device as claimed in claim 2, wherein the first display period comprises a first sub-period and a second sub-period,
wherein during the first sub-period, the pull-up control circuit sets the voltage level of the first node to the first voltage level and the timing controller sets the first clock signal to be equal to the second gate voltage,
wherein during the second sub-period, the timing controller sets the first clock signal to be equal to the first gate voltage, and the voltage level of the first node is increased to a third voltage level that is higher than the first voltage level.

4. The touch display device as claimed in claim 3, wherein responsive to the voltage level of the first node being equal to the first voltage level or the third voltage level, the second transistor sets a voltage level of the second node to be equal to the second voltage level.

5. The touch display device as claimed in claim 4, wherein responsive to the operation voltage being equal to the first gate voltage and the voltage level of the first node being equal to the second voltage level, the first transistor sets the voltage level of the second node to be equal to the operation voltage.

6. The touch display device as claimed in claim 1, wherein the touch-sensing period is between the first display period and the second display period.

7. The touch display device as claimed in claim 1, wherein during the touch-sensing period, the first clock signal and the second clock signal are equal to the second gate voltage, and the voltage level of the first node is not equal to at the second voltage level.

8. The touch display device as claimed in claim 1, further comprising:
a display panel, wherein the gate driver and the data driver are disposed on the display panel.

9. The touch display device as claimed in claim 1, further comprising:
a display panel, wherein the gate driver is disposed on the display panel; and
a flexible printed circuit board electrically coupled to the display panel, wherein the data driver is disposed in the flexible printed circuit.

10. A gate driver generating a first scan signal and comprising:
a first shift register comprising:

a first pull-up control circuit configured to set a voltage level of a first node to a first voltage level according to a start signal;
a first pull-down control circuit configured to set the voltage level of the first node to a second voltage level that is lower than the first voltage level, wherein the first pull-down control circuit comprises:
a first transistor receiving an operation voltage; and
a second transistor connected to the first transistor in series and coupled to the first node, wherein the first transistor and the second transistor are coupled to a second node; and
a first pull-up output circuit receiving a first clock signal and generating the first scan signal according to the voltage level of the first node,
wherein during a first display period and a second display period, the operation voltage is equal to a first gate voltage, and during a touch-sensing period, the operation voltage is equal to a second gate voltage that is lower than the first gate voltage,
wherein the first pull-down control circuit comprises a third transistor setting the voltage level of the first node to the second voltage level according to a second clock signal,
wherein during the second display period, phases of the first clock signal and the second clock signal are opposite at all times.

11. The gate driver as claimed in claim 10, wherein the touch-sensing period is between the first display period and the second display period.

12. The gate driver as claimed in claim 11, wherein the first display period comprises a first sub-period and a second sub-period,
wherein during the first sub-period, the first pull-up control circuit sets the voltage level of the first node to the first voltage level according to the start signal,
wherein during the second sub-period, the voltage level of the first node is increased to a third voltage level that is higher than the first voltage level.

13. The gate driver as claimed in claim 12, wherein responsive to the voltage level of the first node being equal to the first voltage level or the third voltage level, the second transistor sets the voltage level of the second node to the second voltage level.

14. The gate driver as claimed in claim 10, further comprising:
a second shift register connected to the first shift register in series to generate a second scan signal and comprising:
a second pull-up control circuit configured to set a voltage level of a third node to the first level according to the first scan signal;
a second pull-down control circuit configured to set the level of the third node to the second level, wherein the second pull-down control circuit comprises a second transistor receiving the operation voltage and coupled to a fourth node; and
a second pull-up output circuit generating the second scan signal according to the level of the third node.

* * * * *